United States Patent

Donaldson et al.

US005753574A

[11] Patent Number: 5,753,574
[45] Date of Patent: May 19, 1998

[54] METAL INFILTRATED CERAMIC ELECTRICAL CONDUCTOR

[75] Inventors: Anthony Donaldson, Greenville, Ill.; Norbert B. Elsner; Saeid Ghamaty, both of La Jolla, Calif.

[73] Assignee: Hiz Corp., San Diego, Calif.

[21] Appl. No.: 716,025

[22] Filed: Sep. 16, 1996

[51] Int. Cl.[6] ........................................ C04B 35/58
[52] U.S. Cl. ........................................ 501/96.3
[58] Field of Search ........................ 428/304.4, 312.2, 428/312.8, 319.1, 318.4, 427, 432, 704; 501/134, 96.3

[56] References Cited

U.S. PATENT DOCUMENTS

| | | | |
|---|---|---|---|
| 4,891,338 | 1/1990 | Gesing et al. | 501/87 |
| 5,011,063 | 4/1991 | Claar | 228/176 |
| 5,110,637 | 5/1992 | Ando et al. | 428/427 |
| 5,248,639 | 9/1993 | Elsner et al. | 501/98 |
| 5,400,947 | 3/1995 | Wang et al. | 228/124.5 |

*Primary Examiner*—Paul J. Thibodeau
*Assistant Examiner*—Cathy F. Lam
*Attorney, Agent, or Firm*—John R. Ross

[57] ABSTRACT

A composition having an empirical formula $MB_{2-z}+N$, wherein $0<z<0.10$ and M is selected from the group consisting of Zr, Hf and Ti, wherein N is selected from a group consisting of Cu, Au and Ag and wherein the $MB_{2-z}$ defines a ceramic matrix structure defining a volume with void spaces comprising at least 10 percent of the volume of the matrix structure and the N occupies at least 70 percent, by volume, of the void spaces. A preferred method of making the composition is a two step process: First, $ZrB_2$ powder (which preferably is slightly enriched in Zr is vacuum hot pressed at a hot pressing temperature of about 2150 degrees C. to create a ceramic matrix having a density of about 68 percent. Second, the ceramic matrix is heated in a pool of copper at a vacuum and at an infiltration temperature of about 1700 degrees C. to permit copper from the pool to infiltrate the ceramic matrix.

12 Claims, No Drawings

METAL INFILTRATED CERAMIC ELECTRICAL CONDUCTOR

This invention relates to electrical conductors and in particular to electrical conductors with high thermal conductivity and shock resistance.

BACKGROUND OF THE INVENTION

Electrical conductors with high thermal conductivity and shock resistance are needed for uses such as electrodes in electrical discharge machining. Conductors presently used for such purposes typically include electrodes made of graphite, copper-tungsten, steel, zinc-tin alloys, copper, brass, and silver-tungsten. In these uses the electrodes typically erode due to the very high temperatures and mechanical forces in the region of the electrical arc. In some applications erosion is not a serious problem; however in other applications, especially where electrodes are expensive, where precision is needed or where replacement of the conductor is difficult or impossible, erosion is serious.

$ZrB_2$ has been proposed as an electrical conductor with high erosion resistance. One of the Applicants and John Norman were granted a patent (U.S. Pat. No. 5,248,639, issued Sep. 28, 1993, disclosing a $ZrB_2$ composition which was sightly enriched in Zr. This composition provides enhanced electrical and thermal conductivity and improved thermal shock resistance as compared to the then prior art $ZrB_2$ conductors. U.S. Pat. No. 5,248,639 is hereby incorporated herein by reference.

Tests with $ZrB_2$ conductors when used as electrodes, even those fabricated according to the teachings of the above patent, have shown a tendency of the $ZrB_2$ to erode by spalling.

What is needed is a $ZrB_2$ conductor with improved spalling resistance.

SUMMARY OF THE INVENTION

The present invention provides a composition having an empirical formula $MB_{2-z}+N$, wherein $0<z<0.10$ and M is selected from the group consisting of Zr, Hf and Ti, wherein N is selected from a group consisting of Cu, Au and Ag and wherein the $MB_{2-z}$ defines a ceramic matrix structure defining a volume with void spaces comprising at least 10 percent of the volume of the matrix structure and the N occupies at least 70 percent, by volume, of the void spaces. A preferred method of making the composition is a two step process: First, $ZrB_2$ powder (which preferably is slightly enriched in Zr is vacuum hot pressed at a hot pressing temperature of about 2150 degrees C. to create a ceramic matrix having a density of about 68 percent. Second, the ceramic matrix is heated in a pool of copper at a vacuum and at an infiltration temperature of about 1700 degrees C. to permit copper from the pool to infiltrate the ceramic matrix.

DETAILED DESCRIPTION OF PREFERRED EMBODIMENTS

Preferred Embodiment

A preferred high temperature thermal shock resistant electrical conductor has been prepared as follows:

A batch of $ZrB_2$ powder (provided by Advanced Refractory Technologies, Buffalo, N.Y.) with a 1 percent excess of Zr (in accordance with the teachings of U.S. Pat. No. 5,248,639 was vacuum hot pressed at 2150 degrees C. and 500 psi for a period of ½ hours to produce a 68 percent dense sintered structure that was strong and could endure rugged handling. The structure was placed in a molten copper bath at 1704 degrees C. and under vacuum for a period of 4 hours where the copper was permitted to infiltrate into the $ZrB_2$ structure. The resulting composition was a structure comprised of a $ZrB_2$ matrix with Cu infiltrated within the matrix with the Cu comprising about 32 percent by weight of the composite. Samples produced for testing were rod shaped with a 1.27 cm diameter with a hemispherical tip. The produced composites were tested at Texas A&M University and the tests indicate that electrodes made of the composition would wear 150 times less than electrodes made of graphite and 10,000 times less than electrodes made of copper.

Our tests show that when the $ZrB_2$ is hot pressed in accordance with the above described procedure, it is not necessary to pressurize the Cu to force it into the matrix. It is preferred that both the hot pressing step and the infiltration step be in a vacuum so the surface oxides are removed via the formation of volatile boron oxides. When the $ZrB_2$ sintered structure is formed, the surface of the structure and the walls of the internal voids in the structure are substantially free of oxides. Liquid Cu will then wet the $ZrB_2$ and the Cu will readily infiltrate the $ZrB_2$ matrix.

Failed Attempts

If too much excess Zr is used (more than about 10 percent by weight) excessive Zr liquid phase is formed and the hot pressed structure is too dense leaving insufficient room for enough copper to infiltrate into the matrix. If the hot pressing temperature is less than about 1600 degrees C., again the matrix is inferior because of weak bonding between $ZrB_2$ grains.

Attempts were made to short circuit the process by blending the Cu in with the $ZrB_2$, attriting the powders together in a high energy ball mill followed by vacuum hot pressing to produce a homogeneous microstructure. However the resitivities of the resulting samples were about 2 to 3 times that of the Cu infiltrated samples.

In addition to Cu, Si and Sn were tested but the results were poor as compared to the Cu. However, gold and silver can be used in place of the copper as discussed below.

Electrical Discharge Machining

An important use of the above described composition is as an electrode in electrode discharge machining. In electrical discharge machining, an electrode is brought within a few microns of the surface of a conductive work piece. A pulsed direct current is applied (with about 40 to 400 volts applied between the electrode and the workpiece) across the gap between the electrode and the workpiece at high frequencies (typically a few kHz) which results in the creation of short duration (typically, a few microseconds to about 100 microseconds) very high power density electron current pulses flowing usually from the electrode into the workpiece. A dielectric fluid usually floods the gap to help control the current and supply cooling. The high power pulses heat small spots on the surface of the workpiece to very high temperatures vaporizing or ablating portions of the surface of the workpiece. This technique of machining is typically used in situations where conventional machining is difficult or impossible. Current typically flows during the pulses through thin filaments which attach to the electrode and the workpiece. Thus, the arcs are often referred to as filamentary arcs. In the course of eroding the workpiece, the high power electron current pulses also erode the surface of the electrode. It is normally desirable to minimize electrode erosion.

Arc-Electrode Interaction in Metal Electrodes

For pulsed power filamentary arcs produced with metal electrodes, there are at least three different arc-electrode interaction regimes. (For an additional background discussion of electrode erosion in high current arcs, see the doctoral dissertation of one of the Applicants, "Electrode Erosion in High Current, High Energy Transient Arcs, PhD Dissertation by Anthony L. Donaldson, December 1990, Texas Tech University.) The regimes are 1) "isolated" filament (single or multiple) evaporation, 2) collective filament melting and ablation, and 3) collective filament vaporization or sublimation. In the first regime, the erosion from very small spots (or points) on the filament attachment to the electrode is primarily due to vaporization at those spots due to very high current density (up to $10^{12}$ A/m$^2$). In a typical pulsed arc, as the current increases after breakdown, the cathode arc attachment transitions from a single current carrying filament to an expanding ring of filaments with the current per filament remaining approximately constant. As the current increases, additional sets of expanding filament rings may be formed inside the original one leading to some collective efforts due to an increase in the macro current density. The current density may be increased further as JXB forces acting on the arc lead to arc "pinching' at both electrodes. Melting may begin to take place between several filament points and eventually the entire macro arc attachment region may become molten. As this occurs, there may exist one or more forces which may ablate the electrode surface; i.e., remove the molten layer as it is formed, which characterizes the erosion in the second regime. It should be noted that molten material may be formed in the first regime but sufficient removal mechanisms may not be present; i.e., the material may spread around the surface and resolidifies after the pulse is over. Finally, as the current increases even more, evaporation begins to occur over the entire macro arc electrode interaction region as well, which characterized the 3rd regime.

Thermal Spalling

With $ZrB_2$ electrodes, thermal spalling may be dominant over melting and vaporization especially in the low heat regimes. Thermal spalling is usually defined as a mechanical failure of the electrode material, without melting, due to internal stresses which overcome the bond strength. This occurs as a material expands or contracts during a sudden temperature change, resulting in tension or compression sufficient to cause tensile or shear failure respectively. In the pulsed arc the electrode material goes through thermal cycling, so a complex temperature gradient is established which is a function of, among other things, the current pulse characteristics (magnitude, length, duty cycle, etc.) and most importantly the electrode material properties. Most of the electrode materials considered are weaker in tension than in compression, so the material will fail anytime that its ultimate tensile strength is exceeded.

On sudden heating, local highly compressive shear stresses develop because the material exposed to high temperature tries to expand but is prevented from doing so by the cooled interior material. At the same time, this places the interior material in tension as it is pulled by the outer material as it tries to expand. This situation is reversed on sudden cooling. Naturally, materials with high coefficients of thermal expansion and low thermal conductivities are subjected to higher stresses due to more severe gradients. If a material has a low ultimate tensile strength or Young's modulus as well, the tendency to spall is enhanced. When the arc and its individual filaments are localized in the same spot, the material may also break by fatigue after a limited number of pulses. An additional property which is important for spalling is the melting point. If the melting point is low enough, the material simply melts or vaporizes and no stresses build up in the material to cause fracture. It is interesting to note that spalling has been observed to occur in electro discharge machining for materials with melting temperatures above 2500 degrees C. (for example, $TiB_2$). In our case, this would imply that $ZrB_2$, which melts at 3100 degrees C., would spall in contrast with Cu, which melts at 1083 degrees C. Since for a given amount of pulse energy, more material is removed by spalling versus melting, one might expect a higher erosion rate for $ZrB_2$ when compared to Cu.

Explanation of Results

Applicant is not completely certain of the reasons for the excellent properties of the $ZrB_2$ matrix infiltrated with Cu. As indicated above, tests show that $ZrB_2$—Cu electrodes used for electrical discharge machining last about 150 times longer than graphite electrodes and 10,000 times longer than copper electrodes. The test also indicate that the copper infiltration reduces by an order of magnitude the spalling experienced with uninfiltrated $ZrB_2$. With uninfiltrated $ZrB_2$, Applicants' suspect that very tiny (with dimensions of a few microns), very hot (in excess of the vaporization temperature of copper which is 2572 degrees C.) hot spots develop at the surface of the electrode during the electrical pulse. The pulse duration is typically a few microseconds (from about 1 microseconds to 75 microseconds) and the pause time (the time between pulses) is typically about 100 microseconds to a few hundred microseconds. Applicants believe these tiny hotspots stress the material causing spalling. The spalling shows up as tiny craters a few microns across on the surface of the electrodes. On the other hand, when copper is present in the matrix in sufficient quantity, the copper absorbs a substantial portion of the energy of the pulse. As the temperature of the copper at a tiny hot spot reaches 1084 degrees C., the copper begins to melt and the phase change absorbs heat energy from the hot spot and retards the temperature rise at the spot. If additional heat continues to be added at the spot, the temperature at the spot may continue to rise until the temperature reaches the vaporization temperature of copper, 2572 degrees C. At that point some of the copper at the electrode surface may vaporize which absorbs additional energy from the hot spot retarding further temperature rise at the spot. The hot spot very quickly cools after the end of the pulse and our calculations indicate that the temperature of the hot spot cools to substantially below the melting point of copper at the end of the pause time after the pulse. Also, since hot spots are fairly randomly distributed over the surface of the electrode during the machining process the next pulse is unlikely to produce another hot spot at the location of the prior hot spot. Thus, the copper acts as a heat sink absorbing hot spot energy to reduce the temperature of the hot spot during pulses so as to allow the energy in the hot spot to be dissipated into the surrounding volume of the electrode. The phase changes (solid to liquid or gas) absorb a substantial portion of the pulse energy which is dissipated within the tip of the electrode so that spalling of the $ZrB_2$ is virtually eliminated.

This theory may explain why it seems to be very important to first create a solid matrix of $ZrB_2$ and then infiltrate the Cu. For if Cu atoms were a part of the basic matrix the matrix could fail if the Cu melted or vaporized, whereas if the Cu is merely an infiltrator, its melting or vaporization should not substantially affect the matrix structure. Further discussion of the advantages of a matrix structure for electrode material, see the Donaldson dissertation referenced above.

Applications

This metal infiltrated high temperature ceramic conductor as described above will have many uses. These include: electrodes for electrical discharge machining, spot welding electrodes, thermal bonding electrodes, pulse power electrodes such as those used to break down pollutants like $NO_x$ and $SO_x$, electrodes for arc jet engines and plasma spray guns.

EXAMPLES OF $ZrB_2$—Cu PRODUCTION

2150 Degrees C.–500 PSI Hot pressing $ZrB_2$ powder was commercially procured from Cerac, located in Milwaukee, Wis. The Cerac grade of this powder was Z1031 and the particular batch was 57293-C-1. This powder was very slightly enriched in Zr, Applicants estimate the composition to be $ZrB_{2-x}$, where x is about 0.07.

The powder was loaded in a graphite die, approximately one inch in diameter, that contained a Graphoil liner (about 0.002 inch thick). Graphite plungers contained the $ZrB_2$ powder in the die. The graphite die and plunger assembly was placed in a vacuum hot press and the system evacuated to less than $9 \times 10^{-4}$ Torr. A compressive load of 500 pounds was placed on the plungers. The die assembly was heated under dynamic vacuum to 2150 degrees C. for ½ hour at this same 500 pound load. The die assembly was then allowed to cool to room temperature in an inert gas. The diameter of the finished sample was 1.75 inches, had a length of 1.21 inches and weighed 75.268 grams and its electrical resistivity was 14 to 15 micro-ohms-cm. This specimen was cut in half yielding two cylinders. The density of the cylinder was determined to be 4.16 grams/cc which is about 68 percent of the maximum density of $ZrB_2$.

One of the $ZrB_2$ cylinders was placed in a graphite boat with chunks of Cu placed around the $ZrB_2$. The assembly was placed in a graphite container with a lid to minimize Cu loss due to vaporization. The graphite container was placed in the same vacuum furnace referred to above and the system similarly evacuated. The assembly was heated in vacuum to 1700 degrees C. and held 4 hours. The melted Cu infiltrated the $ZrB_2$ cylinder by capillary action so that all but a very small percentages of voids in the cylinder were filled with copper as determined by a subsequent density determination and metalographic examination. The density after infiltration had risen to 6.85 grams/cc and the resistivity had decreased to 3.77 micro-ohms-cm.

1760 and 2000 Degree Hot Pressing Temperatures

Electrodes were produce using the process described above but with sintering temperatures of 1760 degrees C. and 2000 degrees C. and upon examination the $ZrB_2$ matrix appeared to be weaker and the copper did not infiltrate the matrix nearly as well.

Procedure to Assure Slight Excess Zr

Applicants have discovered that the stoichiometry of commercially available $ZrB_2$ powder can vary substantially. Applicants have determined a simple method of checking, and correcting if necessary, the stoichiometry. A shortage of Zr will cause a $ZrB_2$ puck to exhibit high electrical resistance. The procedure is to hot press a sample of the material at a high pressure of about 7,000 psi and a temperature of about 2150 degrees C. After pressing the electrical resistance of the puck is checked. If the $ZrB_2$ puck has acceptable stoichiometry, the resistivity will be about 5 micro-ohms-cm. If it is deficient in Zr the resistance could be as high as 10 micro-ohms-cm or higher. If the resistivity is too high, a small quantity of $ZrH_2$ is added to the powder. ($ZrH_2$ is preferred over elemental Zr because elemental Zr oxidizes readily.) Another sample puck is then made at 7,000 psi and the resistivity checked again and the procedure is repeated until good values of resistivity are obtained. Hot pressing at 7,000 psi produces pucks with densities of almost 100 percent. When the right stoichiometry is obtained then electrodes are hot pressed at 500 psi. At 500 psi the density is only about 68 percent as stated above which allows space in the $ZrB_2$ matrix for the Cu infiltration.

Hot Pressing Range Discussion

Applicants' experiments show that a sintering temperature of 2150 degrees C. for ½ hour produces good electrodes. If the temperature is too high or if it is maintained for too long of a period of time, the structure will further densify, many of the pores will become closed and Cu will not be able to infiltrate. If the temperature is too low or the time too short the matrix will be weaker and the matrix could collapse before or during the attempt to infiltrate the Cu. From the above discussion, Applicants recommend a sintering temperature of 2150 degrees C. for ½ hour or higher temperature for shorter duration or lower temperatures with longer duration. The highest recommended temperature is 2315 degrees C. for only a few minutes and the lowest temperature recommended would be 1870 degrees for several hours. An advantage of processing at higher temperatures is that boron oxides are more volatile at the higher temperatures and are therefore more likely to be removed.

Infiltration Range Discussion

Applicants' best sample was obtained with a four hour Cu infiltration time at a temperature of 1700 degrees C. At a higher temperature the infiltration time could be shortened since, in general a higher temperature increases the infiltration rate; however, higher temperature also increases the solubility of $ZrB_2$ in Cu. Thus, as the Cu infiltration temperature is increased above 1700 degrees C., the $ZrB_2$ structure can be weakened or it could collapse. Lower temperature (below 1700 degrees C.) is also an option, but Cu may experience poor wetting in some sections due to residual oxides on the $ZrB_2$ surfaces. Longer infiltration times will to some extent compensate for the reduced wetting. Longer infiltration times gives the oxides additional time to vaporize allowing the Cu to infiltrate further. Summarizing, recommended infiltration times and temperatures are four hours at 1700 degrees F., with a range of about 1540 degrees C. for about 7 hours to 1930 degrees C. for about ½ hour.

Infiltration with Silver and Gold

In addition to Copper, the $ZrB_2$ matrix can be infiltrated with silver and gold. Silver and gold have melting temperatures and vaporization temperatures and wetting and conduction properties similar to copper. Therefore, these metals can be infiltrated into $ZrB_2$ like copper and should have the same general effect as the copper in preventing spalling, and in some applications gold or silver could be preferred. The big disadvantage of silver and gold is that these materials a much more expensive than copper. Recommended infiltrations temperatures would be about 1700 degrees C. for gold or for silver with a four hour infiltration time. Ranges like those discussed above could be used.

$TiB_2$ and $HfB_2$

Titanium diboride and Hafnium diboride can also be hot pressed into a matrix structure and then infiltrated with copper, gold or silver to produce an electrode resistant to spalling. The recommended process is similar to that described in detail above except the sintering temperatures should be adjusted downward for titanium and upward for hafnium taking into account their differences in melting points. A sintering temperature of 2200 degrees C. is recommended for $HfB_2$ and a sintering temperature of 2050 degrees C. is recommended for $TiB_2$.

While the above description contains many specificities, the reader should not construe these as limitations on the scope of the invention, but merely as exemplifications of preferred embodiments thereof. Those skilled in the art will envision many other possible variations that are within its scope. For example as discussed in U.S. Pat. No. 5,248,639, Ti and or Hf could replace a portion or all of the Zr in the $ZrB_2$ starting powder. There are other well known methods of producing porous ceramic structures which can be infiltrated with copper, silver and gold. For example, $ZrB_2$ powder can be blended with an organic binder and injection molded to the desired dimensions. The injection molded part can then be heated (at about 500 degrees C.) in a vacuum or inert gas furnace to slowly remove the binder. The part can then be fired at about 2100 degrees C. to obtain a density of about 68 percent and remove surface oxides. $ZrB_2$ powder can also be fabricated into a desired shape by cold pressing and sintering. The powder is first cold pressed into the desired shape (with or without a binder). The cold pressed component is then sintered at about 2100 degrees C. in a vacuum to obtained a 68 percent density and to remove the surface oxides. A third alternative approach is a to form the 68 percent porous $ZrB_2$ structure by plasma spraying the $ZrB_2$ powder on a removable substrate. The $ZrB_2$ is then heated to 2100 degrees C. to remove the surface oxides. A fourth approach is to form the $ZrB_2$ parts by slip casting. After the slip cast parts are dried in air they are then fired at about 2100 degrees C. in vacuum to obtain about 68 percent density and remove the surface oxides. Components fabricated by these processes can be very near the net shape and low in cost to produce. With the above techniques for forming the $ZrB_2$ porous shapes, the same Cu infiltration process described above can be used for fabricating the ZrB2-Cu composites Accordingly, the reader is requested to determine the scope of the invention by the appended claims and their legal equivalents and not by the examples which have been given.

We claim:

1. A composition having an empirical formula $MB_{2-z}+N$, wherein $0<z<0.10$ and M is selected from the group consisting of Zr, Hf and Ti, wherein N is selected from a group consisting of Cu, Au and Ag and wherein the $MB_{2-z}$ defines a ceramic matrix structure defining a volume with void spaces comprising at least 10 percent of the volume of the matrix structure and the N occupies at least 70 percent of the void spaces.

2. A composition as in claim 1 wherein M is Zr.

3. A composition as in claim 1 wherein M includes Zr and Hf.

4. A composition as in claim 1 wherein M includes Zr and Ti.

5. A composition as in claim 1 wherein M is Hf.

6. A composition as in claim 1 wherein M is Ti.

7. A composition as in claim 1 wherein z is about 0.07.

8. A composition as in claim 1 wherein N is copper.

9. A composition as in claim 1 wherein said void spaces comprise at least 30 percent of the volume of said matrix.

10. A composition as in claim 9, wherein said void spaces comprise about 32 percent of the volume of said matrix.

11. A composition as in claim 10 wherein said void spaces comprise at least 32 percent of the volume of said matrix and the Cu occupies at least 95 percent of the void space.

12. A composition $ZrB_{2-z}+Cu$, wherein $0<z<0.10$ and $ZrB_{2-z}$ defines a ceramic matrix structure defining a volume with void spaces comprising at least 10 percent of the volume of the matrix structure and the Cu occupies at least 70 percent of the void spaces.

* * * * *